United States Patent
Tsukihashi

(10) Patent No.: US 6,587,416 B1
(45) Date of Patent: Jul. 1, 2003

(54) DISK RECORDING APPARATUS FOR CONTROLLING INTERRUPTION OF DATA AND SECURING INTERLEAVE LENGTH OF FIRST AND LAST BLOCKS OF DATA AFTER START AND RELEASE OF RECORDING INTERRUPTION

(75) Inventor: Akira Tsukihashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/503,234

(22) Filed: Feb. 11, 2000

(30) Foreign Application Priority Data

Feb. 26, 1999 (JP) .......................................... 11-050776

(51) Int. Cl.[7] ............................................... G11B 5/09
(52) U.S. Cl. ............................... 369/59.14; 369/47.28; 369/53.37; 369/59.2
(58) Field of Search ........................... 369/47.28, 53.37, 369/59.14, 59.2

(56) References Cited

U.S. PATENT DOCUMENTS

| | | |
|---|---|---|
| 5,343,455 A | 8/1994 | Takeuchi et al. |
| 5,469,546 A * | 11/1995 | Hosoya ................. 395/182.06 |
| 6,172,947 B1 * | 1/2001 | Senshu ......................... 369/32 |
| 6,226,241 B1 * | 5/2001 | D'Amato et al. ........ 369/47.15 |

FOREIGN PATENT DOCUMENTS

| | | |
|---|---|---|
| EP | 0/520381 | 12/1992 |
| EP | 0/930617 | 7/1999 |
| EP | 0/974966 | 1/2000 |
| JP | 3-288368 | 12/1991 |
| JP | 08/147879 | 6/1996 |

* cited by examiner

Primary Examiner—Doris H. To
Assistant Examiner—Gautam R. Patel
(74) Attorney, Agent, or Firm—Hogan & Hartson, LLP

(57) ABSTRACT

When data recording on a disk is interrupted due to the termination of data reception and recording is then resumed with reception of new data, specific data generated by a data generator (23) is added to the last block of the data received immediately before recording interruption and to the first block of the data received immediately after release of recording interruption to secure the interleave length of the aforementioned last and first blocks, respectively. Thus, the data in the last block of the received data is modulated into recording data and is recorded on the disk before recording interruption. Disk recording is resumed with recording data obtained by modulating data of the first block of the newly received data so that new recording data can be recorded so as to be continuous to the terminal end of the data already recorded on the disk without employing any link blocks.

6 Claims, 2 Drawing Sheets

DISK RECORDING APPARATUS FOR CONTROLLING INTERRUPTION OF DATA AND SECURING INTERLEAVE LENGTH OF FIRST AND LAST BLOCKS OF DATA AFTER START AND RELEASE OF RECORDING INTERRUPTION

BACKGROUND OF THE INVENTION

1. Field of the Invention

The present invention relates to a disk recording system for recording data subjected to error correction including interleaving on a disk in units containing a predetermined number of blocks, and relates in particular to such a disk recording system which ensures continuity of recorded data.

2. Description of Related Art

CD-R (Recordable) drives of the CD (Compact Disc) family are well known disk recording systems which record data on disks. A write-once media such as a CD-R which prohibit physical erasure of already recorded data have a problem that when data to be recorded becomes discontinuous regions used in the recording cannot be corrected by rewriting or re-use.

There is, therefore, a demand for a disk recording system that allows data to be continuously recorded on a disk without wasting medium regions used in the recording, even if the recording data becomes discontinuous.

In a packet write system which records data in packet units, it is possible to continuously record data without wasting medium regions used in the recording, even when the recording data becomes discontinuous. However, the packet write system requires as many as seven link blocks for connecting the packets and use of disk recording capacity in this manner is considered wasted.

However, by writing data at the interrupted data position on a disk so as to be continuous to the interrupted data, the packet write system can be eliminated and data recording which wastes no medium regions can be achieved.

Recording data for the CD system is subjected to CIRC (Cross Interleaved Reed-Solomon Code) error correction and has therefore been interleaved.

Since the interleave length reaches a maximum of 108 frames, this introduces the following problem. Namely, when recording data on a disk so as to be continuous to the interrupted data, the interleave length cannot be simultaneously secured at both the last block of the data received immediately before recording interruption and at the first block of the data received immediately after release of recording interruption.

SUMMARY OF THE INVENTION

The present invention was conceived in view of the foregoing problems and it is an object of the present invention to allow data recording on a disk without requiring formation of any link blocks as in the packet write system, while ensuring appropriate interleaving at the last block of data received immediately before recording interruption and at the first block of data received immediately after resumption of recording.

According to the present invention, when data recording is interrupted due to termination of data reception, specific data is generated by data generation means and is added to the last block of the data received immediately before the interruption so that the interleave length of the block can be secured. Thus, the data in the last block can be appropriately interleaved and modulated for recording on the disk. Further, according to the present invention, when data reception is resumed after the interruption of data recording, the same specific data as in the recording interruption is generated in said data generation means and is added to the first block of data received immediately after resumption of data reception so that the interleave length of the block can be secured. Thus, the data in the first block can be appropriately interleaved and modulated for recording on the disk.

In particular, new data to be recorded is synchronized with the data already recorded on the disk by a synchronizing device and is recorded at a recording start position detected by a recording start position detector. Accordingly, it is possible to continuously record new data at a position which is continuous to the terminal end of the already recorded data.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

A preferred embodiment of the present invention will be described in further detail with reference to the accompanying drawings.

Figure 1:
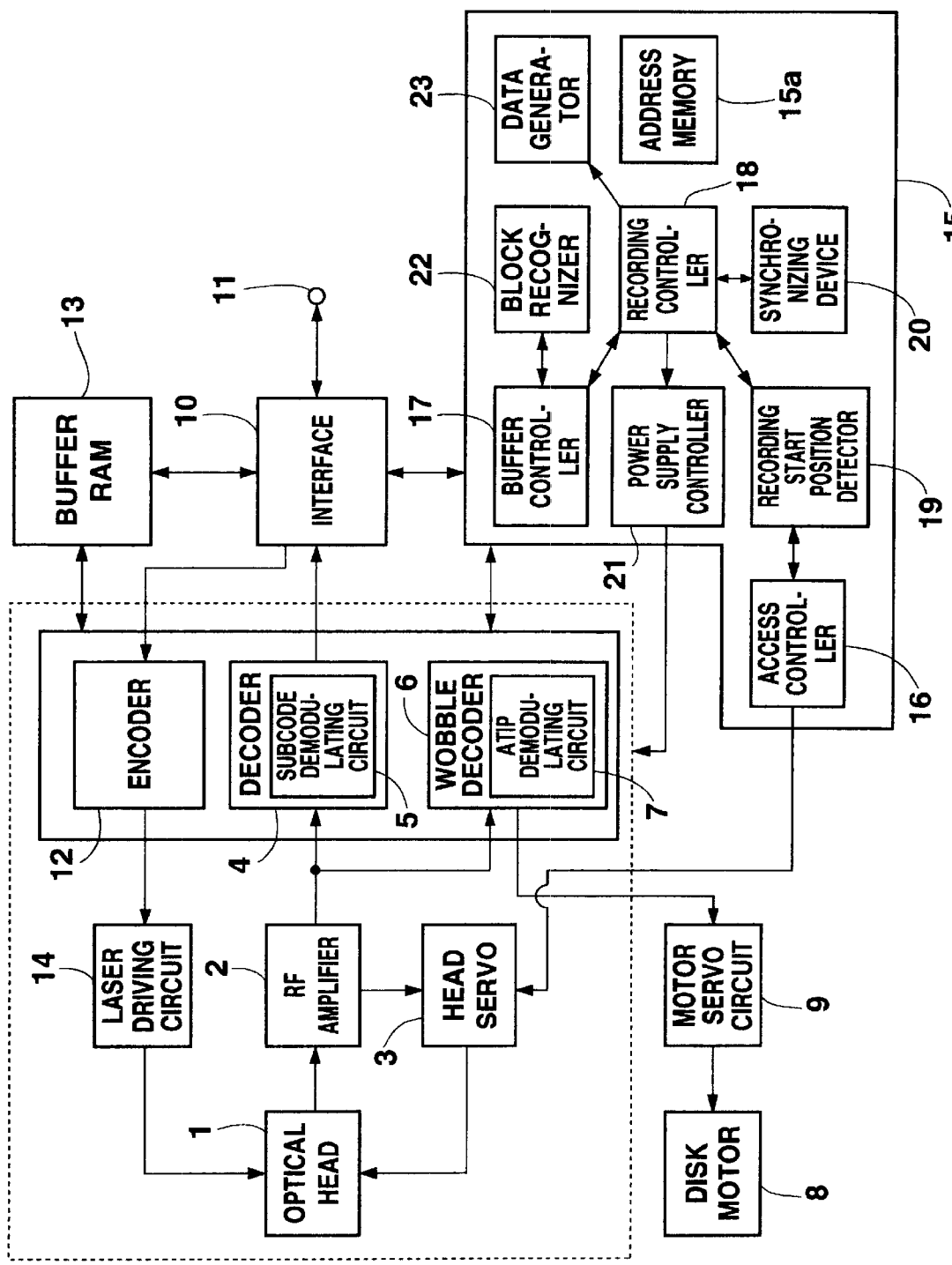
FIG. 1 is a block diagram showing a structure example of a disk recording system according to the present invention.

FIG. 1 is a block circuit diagram showing an example of a CD-R drive as one embodiment of a disk recording system according to the present invention.

In FIG. 1, the system comprises an optical head 1 which irradiates a laser beam to trace a disk for writing/reading data onto/from the disk; an RF amplifier 2 for amplifying an RF signal (a high frequency signal) obtained from the optical head which read recorded data on the disk and coding the RF signal as binary data to be then output as digital data; and a head servo 3 which performs focusing control for feeding back an output of the optical head 1 via the RF amplifier 2 so as to focus a laser beam on a signal surface of the disk, tracking control so that the laser beam will follow a signal track of the disk, and thread feeding control for moving the optical head 1 in the radial direction of the disk.

The system further comprises a decoder 4 for demodulating the digital data output from the RF amplifier 2 and a subcode demodulating circuit 5 for demodulating a separated subcode.

The decoder 4 demodulates the data read from the disk in synchronism with the bit clock reproduced from the read data, so that such demodulation can be performed irrespective of variation in rotation speed of the disk.

The system also comprises a wobble decoder 6 which extracts wobble components of 22.05 kHz from a pre-groove signal of the disk obtained via the RF amplifier 2 to generate components required for rotation control of the disk and has an ATIP (Absolute Time In Pre-groove) demodulating circuit 7 for demodulating an ATIP from the wobble components.

A disk motor 8 for rotationally driving the disk and a motor servo circuit 9 for performing drive control of the disk motor 8 are also provided.

The motor servo circuit 9 can control the rotation of the disk to maintain a constant linear velocity, so that a signal is recorded with a constant linear velocity, or can also control the rotation of the disk to maintain a constant angular velocity when reproducing the data on the disk.

An interface 10 controls data transmission and data reception to and from a host device such as a personal computer connected outside via a connection terminal 11. An encoder 12 modulates data received via the interface 10 into recording data to be recorded onto a disk. A buffer RAM 13 caches data transmitted from the host device connected to the connection terminal 11 before it is modulated into the recording data by the encoder 12. The buffer RAM 13 also caches data read from the disk before it is demodulated by the decoder 4.

The encoder 12 comprises a CD-ROM modulation section which performs modulation based on the CD-ROM standard and a CD modulation section which performs modulation based on the CD-DA standard. The CD-ROM modulation section adds a sync, a header, and an EDC (Error Detection Code) and an ECC (Error Correction Code) for CD-ROM data to the received data. The CD modulation section processes the data output via the CD-ROM modulation section using a CIRC (Cross Interleaved ReedSolomon Code), which is an error correction code for a CD system, and adds a subcode. The data is further subjected to EFM (Eight to Fourteen Modulation) and then a synchronizing signal is added.

A laser drive circuit 14 drives a laser source of the optical head 1 so as to record data on the disk based on the EFM recording data outputted from the encoder 12.

A system control circuit 15 executes system control with regard to disk recording and reproducing. Specifically, the system control circuit 15 comprises access control means 16 for controlling access by selectively referring to a subcode address of absolute time information in a subcode (sub Q data), which is demodulated by the subcode demodulating circuit 5 and to an ATIP address of absolute time information in ATIP which is demodulated by the ATIP demodulation circuit 7; buffer control means 17 for controlling data write/read with respect to the buffer RAM 13; recording control means 18 for controlling disk recording according to the data amount stored in the buffer RAM 13 as a result of data read/write by the buffer control means 17; and recording start position detecting means 19 for detecting the leading end of a non-recorded region on the disk in which no data are recorded to detect a recording start position from which the recording control means 18 starts data recording. The system control circuit 15 further comprises synchronization means 20 for synchronizing new data to be recorded with the data already recorded on the disk by using the synchronizing signal of the subcode extracted by the decoder 4 and the sub Q data demodulated by the subcode demodulating circuit 5; power supply control means 21 for controlling power supply to the predetermined circuits according to the storage data amount of the buffer RAM 13 due to the buffer control means 17; block recognition means 22 for detecting block boundaries of the data received via the interface 10 to recognize each block of the data; and data generation means 23 for generating specific data, for example zero "0", which is preset without concern to the received data. The system control circuit 15 may be a microcomputer operating as each of the aforementioned means through execution of software instructions. It may be preferable, however, for any of the aforementioned means to be hardware circuits.

The power supply control means 21 controls power supply to each of circuits enclosed by the dotted line in FIG. 1, namely each circuit used for data reproducing which performs processes from data reading from the disk through demodulation of the read data, and each circuit used for data recording which performs processes from modulation of received data into recording data through write of the recording data onto the disk.

The disk recording system thus constituted executes a recording operation when the interface 10 receives data to be recorded onto a disk.

When executing a recording operation, the system clock becomes a reference clock with the accuracy of a quartz oscillator.

The optical head 1 is controlled such that a laser output for reproducing disk data reads a pre-groove signal of the disk. After the pre-groove signal read by the optical head 1 is subjected to wave-shaping by the RF amplifier 2, wobble components are extracted from the signal by the wobble decoder 6, and an ATIP is demodulated from the wobble components by the ATIP demodulating circuit 7.

When the host device connected to the connection terminal 11 transmits data to be recorded, the data is received by the interface 10 and is written into the buffer RAM 13.

The interface 10 receives data for each block unit. When the block recognition means 22 recognizes that the number of data blocks written into the buffer RAM 13 has reached a predetermined number preset as a unit for disk recording, the predetermined number of data blocks written into the buffer RAM 13 is modulated into the recording data by the encoder 12.

When a tracing laser beam irradiated from the optical head 1 reaches a write area on the disk, data to be recorded is sequentially output from the encoder 12 for each EFM frame, and address data indicating the address of the corresponding output data is sequentially updated and stored in the address memory 15a of the system control circuit 15.

The laser drive circuit 14 drives a laser source of the optical head 1 based on the recording data output from the encoder 12, to thereby record the data on the disk.

However, if the received data becomes discontinuous and it is determined that buffer underruns are about to occur, or if reception of the data to be recorded is completed, the encoder 12 can no longer process the received data. Then, the recording control means 18 decides that data recording on the disk should be halted, thereby halting data process by the encoder 12 as well as irradiation of a writing beam from the optical head 1 to interrupt disk recording.

When disk recording is interrupted due to termination of data reception as well as when disk recording is resumed due to resumption of reception of new receiving data, the data generation means 23 generates zeros. In this manner, data corresponding that short of the interleave length of a CIRC (maximally 108 frames for EFM frames) is compensated by the zero data in the last block of the data received immediately before the recording interruption and in the first block of the data received immediately after resumption of data recording, so as to secure data required for the CIRC processing.

Because the maximum interleave length in the CIRC system is 108 frames, there is a possibility that data in a block is delayed by up to 108 frames due to the CIRC processing. Therefore, if one block is constituted by 98 EFM frames as in CD-ROM data, two blocks of zeros are required after the last block of the data received immediately before the recording interruption so as to apply appropriate CIRC processing even to the maximally delayed data. Similarly, two zero blocks are required before the first block of the data received immediately after release of the interruption. Therefore, the data generation means 23 generates two zero blocks and supplies the data to the encoder 12 when the encoder 12 processes data in the aforementioned last and first blocks, respectively.

Thus, the last block of the data received by the interface 10 immediately before the recording interruption, together with the zero "0" data generated by the data generation means 23, is subjected to the CIRC processing, modulated into the recording data by the encoder 12, and recorded on the disk.

When data output from the encoder 12 is interrupted, on the other hand, the address data corresponding to the address of the last frame of the data output from the encoder 12 immediately before the interruption of the recording is stored in the address memory 15a of the system control circuit 15. The recorded address data is constituted by time information of Q channel data of a subcode (sub Q data) and address information indicating the position (No. of data) of an EFM frame in the time information. In accordance with the address data stored in the address memory 15a, the synchronization means 20 manages the hour, minute, and frame of the time information in the sub Q data and the position of an EFM frame in the time information the address of the last frame of the data recorded on the disk indicates.

During the interruption of disk recording, when the next data to be recorded is received by the interface 10, the system becomes ready to resume recording data to the disk.

Specifically, when new data to be recorded is received by the interface 10, the access control means 16 accesses the data which had been recorded on the disk before data recording was interrupted using the ATIP demodulated by the ATIP demodulating circuit 7, and the optical head 1 begins tracing.

Once tracing is begun, a pit signal on the disk formed by recording data on the disk is read out by the head 1, and the EFM data becomes available from the RF amplifier 2.

Further, the system clock is switched to a reproduction clock which is in synchronism with the EFM data, and the decoder 4 and the encoder 12 are ready to perform demodulation and modulation, respectively, in synchronism with the reproduction clock.

When the data to be recorded is received by the interface 10 and the predetermined blocks of data is written into the buffer RAM 13, the encoder 12 resumes modulation to create the recording data.

On the other hand, when the EFM data input to the decoder 4 is obtained by tracing the disk, the decoder 4 is ready to extract a synchronizing signal of a subcode while the subcode modulating circuit 5 demodulates the sub Q data. The synchronization means 20 establishes synchronism between the already recorded data and the recording data output from the encoder 12 using the synchronization signal and the sub Q data.

In the time required for such synchronization to be established, the encoder 12 can process newly received data and is thus in a stand-by status where the new recording data can be output.

More specifically, the encoder 12 processes the first block of the data newly received by the interface 10 together with zero data generated by the data generation means 23 to create the recording data. Then, the encoder 12 turns to the stand-by status for outputting the recording data.

As the encoder 12 is in the standby status, the recording start position detecting means 19 detects the leading end position of the non-recorded region of the disk immediately after the recorded region in which data are already recorded by referring to the address data stored in the address memory 15a.

The position of the leading end in the non-recorded region is detected based on the time information of the sub Q data and the EFM frame position in the time information. For the subcode frame (a collection of 98 EFM frame units), detection is performed by the sub Q data, whereas, for the EFM frame, channel bits are counted one at a time using a synchronization signal as a reference, thereby determining the terminal end of the last frame of the data recorded on the disk. Here, the number of channel bits that constitute one frame is predetermined.

When the leading end of the non-recorded region is detected, the system clock is gradually switched from the reproduction clock to the reference clock. Simultaneously, the recording control means 18 allows the encoder 12 to output the recording data, thereby resuming the data recording on the disk.

At the time when the disk recording is resumed, synchronization has been already established by the synchronization means 20 between the already recorded data on the disk and the recording data to be output from the encoder 12.

Accordingly, the first block of the data newly received by the interface 10 is processed together with the zero data generated by the data generation means 23, to create the recording data, which is then recorded on the disk at the position continuous to the terminal end of the already recorded data. Thereafter, data subsequently received is sequentially processed to be modulated into the recording data by the encoder 12 and recorded onto the disk.

As already described, two blocks of zero data are required after the last block of the data received immediately before the recording interruption and before the first block of the data received immediately after the resumption of the recording, respectively. However, since these two blocks of zero data are commonly used at these last and first blocks, only two blocks of zero data are written on the disk, for both the last and first blocks, as data compensating for the discontinuous portion of the recording data located before and after the interruption of recording. Namely, according to the present invention, only data corresponding to two blocks are used between continuous data.

Figure 2:
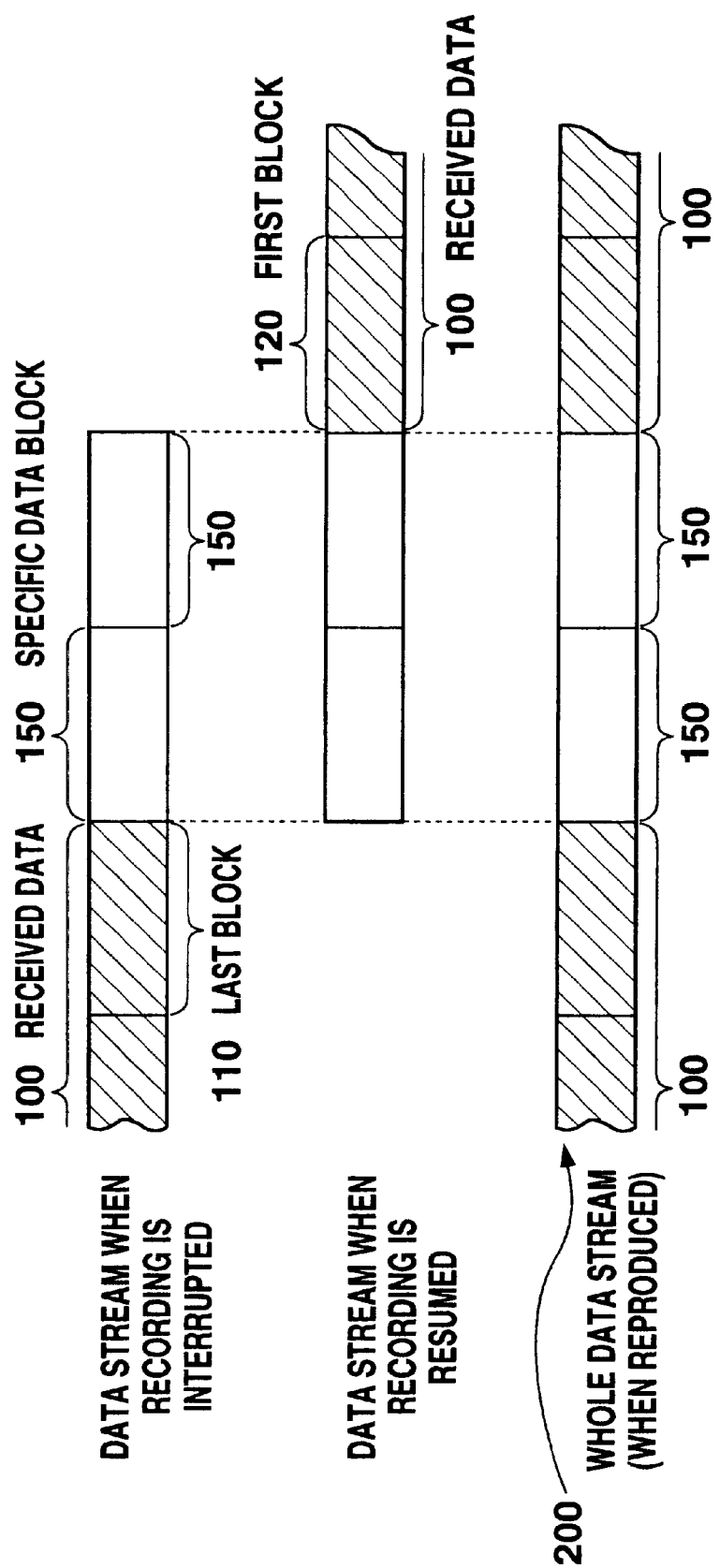
FIG. 2 is a diagram for explaining how specific data is added immediately before recording interruption and immediately after recording resumption.

More specifically, as shown in FIG. 2, in the system of the present invention, in order to secure the interleave length, two blocks 150 of specific "0" data are supplied after the last block 110 of the data 100 received immediately before the interruption when the recording is interrupted whereas two blocks 150 of specific "0" data are supplied before the first block 120 of the data 100 received immediately after resumption of the recording when the recording is resumed. According to the present invention, the recording operation is controlled immediately before the recording interruption and immediately after the resumption of recording such that a pair of two specific data blocks 150 are located at the same position in a data stream 200 (namely, a data stream obtained during reproduction).

More specifically, when data is recorded by supplying two blocks of "0" data after the last block of the data received immediately before the interruption and applying the CIRC process to the data, for example, the recording operation is terminated when a frame containing the maximally delayed data in the last block is recorded. Therefore, zero data which has not been used by this time is not written into the disk. Similarly, when two blocks of zero data are supplied before the first block of the data received immediately after the release of interruption and are subjected to the CIRC process for recording, the actual recording operation is not started until a frame containing the data of the first block is detected. In other words, the data in the frames before such detection is not written on the disk. With the process as described, only data corresponding two blocks among all the zero data supplied to secure the interleave length is actually written into the disk. Under the recording control of the present invention, it is possible to continuously record data with less waste compared to the packet write system, which requires as many as seven link blocks.

When reproducing the recorded data of the disk, on the other hand, the zero data recorded in the discontinuous data portion before and after the recording interruption is skipped to cancel the effects thereof.

Since it is unusual that two block of zero data are continuously recorded, the discontinuous portion of the data can be easily detected by detecting the zero data. Accordingly, the original data can be easily obtained by a data process which skips such "0" data.

The recording control means 18 selectively sets a recording interruption status in which disk recording is interrupted or a recording status in which disk recording is executed, according to the data amount stored in the buffer RAM 13.

Specifically, the recording interruption status is set by the recording control means 18 until the data amount stored in the buffer RAM 13 reaches the preset data write capacity. In this status, the buffer control means 17 inhibits data read from the buffer RAM 13 and only data write to the buffer RAM 13 is executed.

Further, during the recording interruption status, the power supply control means 21 halts operational power supply to each of the circuits enclosed by the dotted line in FIG. 1, such that data modulation by the encoder 12, data writing onto the disk, data reading from the disk, and reproducing of the data of the disk are all interrupted.

Accordingly, power consumption can be reduced in each of the circuits enclosed by the dotted line in FIG. 1 because of the recording interruption status.

Also, in the recording interruption status, the motor servo circuit 9 controls the disk motor 8 such that the rate of rotation of the motor is maintained to that immediately before the recording interruption.

Although such control is disadvantageous with regard to reduction of power consumption, it is advantageous in that it shortens the time required for the motor to reach the rotation speed appropriate for disk recording once the recording status starts, thereby shortening time until disk recording can be resumed.

When the data amount stored in the buffer RAM 13 reaches the aforementioned capacity, the recording control means 18 releases the recording interruption state to set the recording status.

Once the recording status is set, the power supply control means 21 resumes operational power supply to each of the circuits enclosed by the dotted line in FIG. 1, so as to resume data modulation by the encoder 12, data writing onto the disk, data reading from the disk, and reproducing of the data of the disk.

As a result, the data stored in the buffer RAM 13 is modulated and converted into the recording data by the encoder 12, and is recorded to the disk through the optical head 1.

With the structure as described above, the interleave length required for the CIRC process is secured by zero data generated by the data generation means 23 when recording is interrupted due to the termination of data reception and when data record is resumed due to resumption of receiving new data. Therefore, the encoder 12 can process the data in the last block of the data received immediately before the recording interruption as well as the data in the first block of the data received immediately after the recording resumption without any difficulty.

Thus, after all the data in the last block of the data received immediately before the recording interruption is modulated and recorded on the disk, recording is halted. Similarly, after all the data in the first block of the data received immediately after the interruption release is modulated into the recording data, disk recording is resumed.

The disk recording is resumed from the position continuous to the terminal end of the data which have been recorded immediately before the recording interruption.

Further, even if power supply to the disk recording system body is temporality interrupted and is then reset to resume disk recording, the interleave length is secured by zero data generated by the data generation means 23 in the last block of the data received immediately before the recording interruption and in the first block of the data received immediately after the interruption release, thereby enabling the encoder 12 to process data in the aforementioned last and first blocks without any difficulty.

At this point, the address of the last recorded data is recorded in the predetermined location of the disk, which is previously determined according to the disk format. When disk recording is resumed after resetting of the power supply, the address data stored in the address memory 15a is cleared. Thus, the recording start position detecting means 19 accesses the aforementioned predetermined location of the disk to obtain the address of the last recorded data on the disk. By referring to the address data, the leading end of the non-recorded region of the disk is detected.

When the leading end of the non-recorded region of the disk is detected, data recording is resumed from the leading end of the non-recorded region under the control of the recording control means 18.

In this manner, new recording data can be recorded so as to be continuous to the terminal end of the already recorded data.

While the preferred embodiment of the present invention has been described using specific terms, such description is for illustrative purposes only, and it is to be understood that changes and variations may be made without departing from the spirit or scope of the appended claims.

What is claimed is:

1. A disk recording system for recording data on a disk, comprising:

a data processing circuit which receives data for each block and applies a predetermined process to the received data in units of a predetermined number of blocks to generate recording data to be recorded on the disk, said predetermined process including error correction;

a recording controller for controlling interruption and release of interruption of data recording on the disk; and a data generator for generating predetermined specific data which is independent of the received data;

wherein said data processing circuit secures the interleave length of the last block of the data received immediately before the interruption of recording by using the specific data generated by the data generator when applying said process to the last block, and secures the interleave length of the first block of the data received immediately after the release of recording interruption by using the specific data generated by the data generator when applying said process to the first block.

2. A disk recording system of claim 1, further comprising:

a recording start position detecting device for detecting, as a recording start position on the disk, a position continuous to the terminal end of the data recorded on the disk immediately before recording interruption; and a synchronizing device for synchronizing recording data to be recorded on the disk after release of recording interruption with the data recorded on the disk immediately before recording interruption, wherein, when recording interruption is released, the recording data synchronized by said synchronizing device is recorded from the recording start position detected by said recording start position detecting device.

3. A disk recording system of claim 1, further comprising:

an address memory for storing the address of the last recording data output from the data processing circuit immediately before recording interruption; and a recording start position detecting device for detecting a recording start position on the disk for resuming recording when the recording interruption is released based on the address stored in said address memory, wherein, when the recording interruption is released, the recording data is recorded from the recording start position detected by said recording start position detecting device.

4. A disk recording system of claim 1, wherein said specific data comprises a series of zeros.

5. A disk recording system of claim 1, wherein said recording controller controls data recording operation immediately before the recording interruption and immediately after the release of recording interruption, such that the specific data applied to the last block of the data received immediately before the recording interruption and the specific data applied to the first block of the data received immediately after release of the recording interruption occupy the same location in a data stream when reproduced.

6. A disk recording system of claim 1, further comprising:

a motor for rotating the disk; and a servo circuit for maintaining the number of rotations of the motor to that immediately before recording is interrupted when data recording is interrupted by said recording controller.

* * * * *